(No Model.)

F. C. LOWTHORP.
TURN TABLE.

No. 254,670.

Patented Mar. 7, 1882.

2 Sheets—Sheet 1.

WITNESSES:
Harry Drury
James F. Tobin

INVENTOR:
F. C. Lowthorp
by his Attorneys
Howson and Sons (No Model.)  
2 Sheets—Sheet 2.
F. C. LOWTHORP.
TURN TABLE.
No. 254,670. Patented Mar. 7, 1882.
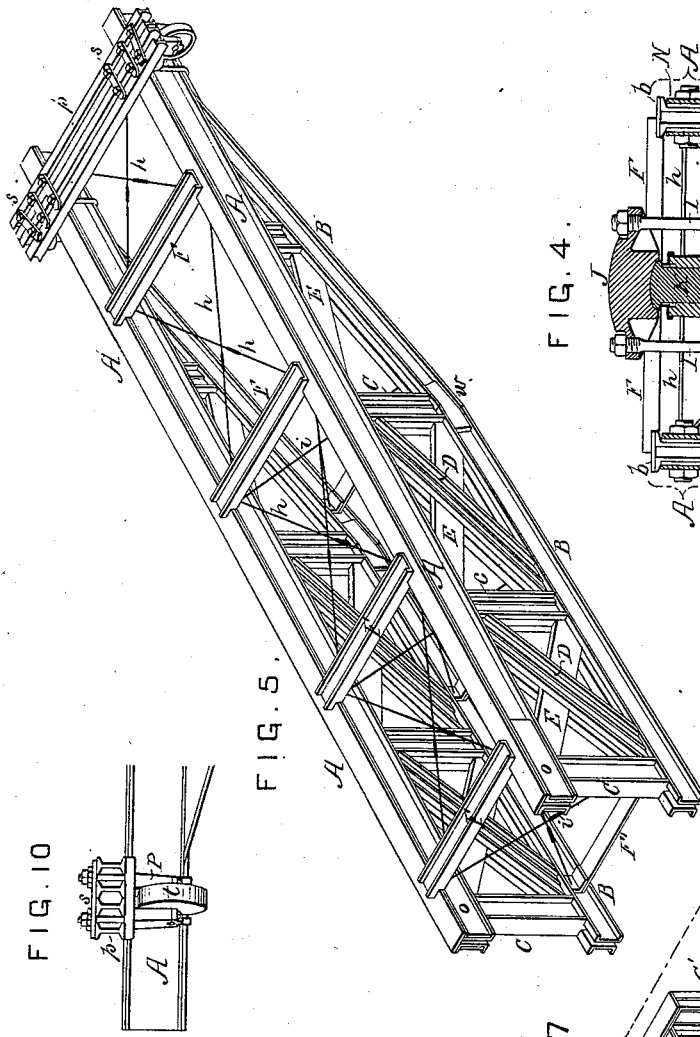
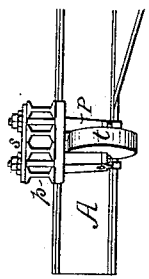
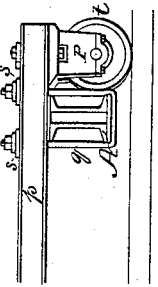
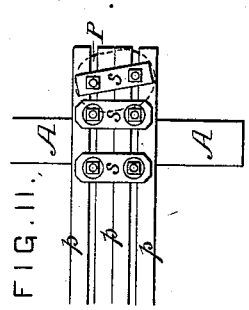
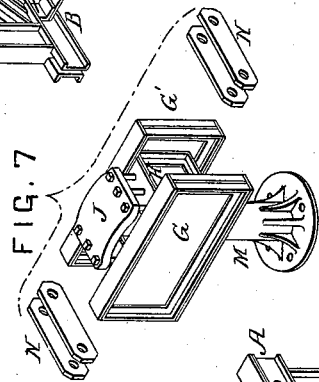
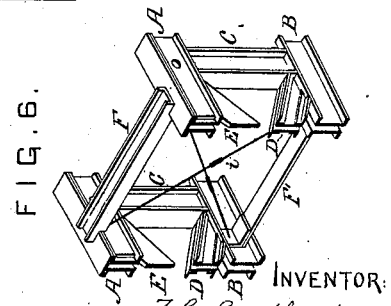
WITNESSES:
Harry Drury
James F. Tobin
INVENTOR:
F. C. Lowthorp
by his Attorneys
Howson and Sons

UNITED STATES PATENT OFFICE.

FRANCIS C. LOWTHORP, OF CHAMBERSBURG, NEW JERSEY.

TURN-TABLE.

SPECIFICATION forming part of Letters Patent No. 254,670, dated March 7, 1882.

Application filed September 27, 1881. (No model.)

*To all whom it may concern:*

Be it known that I, FRANCIS C. LOWTHORP, a citizen of the United States, residing in Chambersburg, Mercer county, New Jersey, have invented certain Improvements in Turn-Tables, of which the following is a specification.

The main object of my invention is to make a light but strong turn-table mainly of wrought-iron or steel, and admitting of being more easily transported and more readily put together than ordinary wrought-iron tables. This object I attain in the manner which I will now proceed to describe, reference being had to the accompanying drawings, in which—

Figure 1:
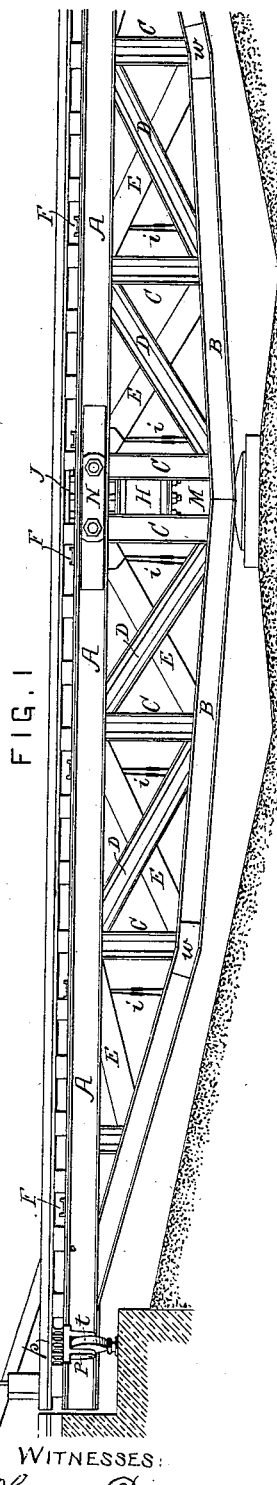
Figure 3:
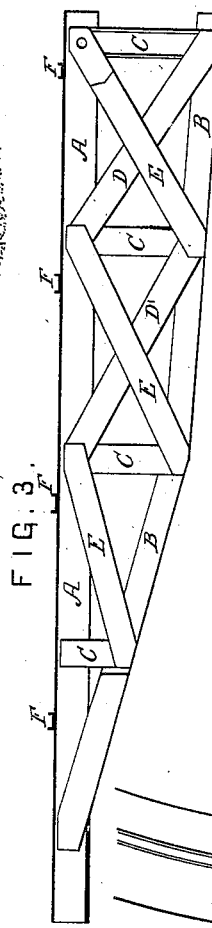
Figure 2:
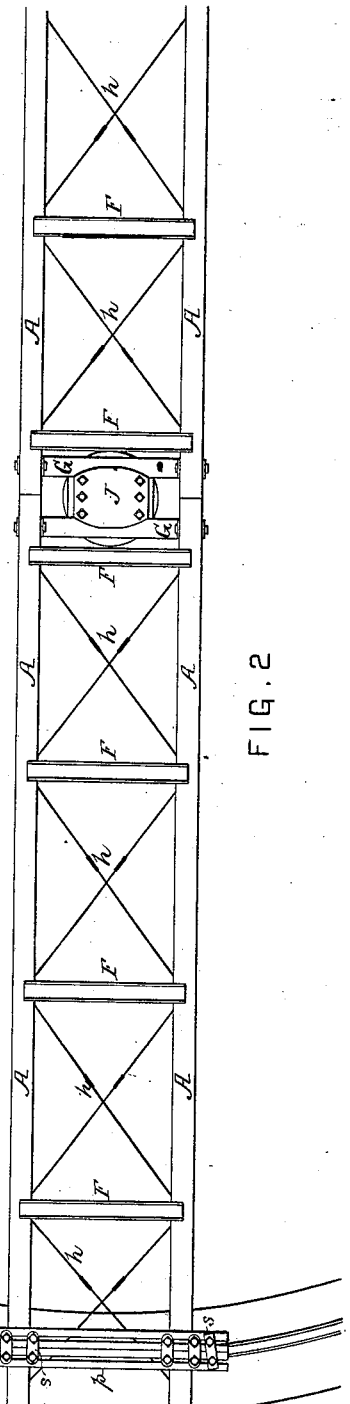

Figure 1, Sheet 1, is a side view of my improved turn-table; Fig. 2, a plan view of Fig. 1 without the cross-ties and rails; Fig. 3, a longitudinal section through one of the girders; Fig. 4, Sheet 2, a transverse vertical section through the pivot, drawn to an enlarged scale; Fig. 5, a perspective view of one of the main frames of the turn-table; Fig. 6, a perspective view of part of the other frame; Fig. 7, views of the central portion of the turn-table; Fig. 8, views of detailed portions of the structure; and Figs. 9, 10, and 11 enlarged views of the end portion of the turn-table.

The prominent features of the turn-table are the two main frames, which constitute the two halves of the main girders of the turn-table, one of these frames being shown in perspective in Fig. 5, Sheet 2, each frame consisting of two truss-girders and upper and lower cross-bars, inclined braces, and end connections, referred to hereinafter.

Each truss-girder is composed of the upper chord, A, lower chord, B, posts or verticals C, diagonals D, and counter-diagonals E, all being made of wrought-iron. I prefer to make the upper chord of two channel-bars, $a\ a$, (best observed in Fig. 4,) arranged a short distance apart from each other, and combined with a top plate or bar, $b$, which extends throughout the entire length of the chord, and is riveted to the upper flanges of the channel-iron bars $a\ a$. The lower chord, B, is also preferably made of two channel-bars, $a'\ a'$, similar to those of the upper chord, and arranged at the same distance apart. The posts C are either made of flat bars strengthened on each edge and on each side by angle-irons, or of channel or T iron or H-iron, the flanges of each post being cut away where it fits above between the channel-bars $a\ a$ of the upper chord, A, and below where it fits between the channel-bars $a'\ a'$ of the lower chord, B, as shown in Fig. 4.

Each diagonal D may consist of two channel-bars, but I prefer to make it of two flat bars, $e\ e$, each strengthened by angle-irons $e'$, as shown in the enlarged view Fig. 8, the bars being arranged at such a distance apart as to permit the counter-diagonal E to pass between them.

It will be understood that the strengthening angle-irons $e'$ are discontinued where each diagonal passes between the bars of the upper and lower chords, the ends of the angle-irons fitting against the chords and posts, as will be readily understood by reference to the side view Fig. 1. The counter-diagonals are, by preference, flat bars. The manner in which the ends of the diagonals and posts overlap each other where they are between the bars of the upper and lower chords will be understood by reference to Fig. 3.

It will be seen on reference to Fig. 1 that the lower chord is inclined upward from the center of the turn-table to the point $w$, whence it is more abruptly inclined until it reaches the upper chord, near the end of the same, where the two chords are properly united. The portion of the lower chord, however, from the center of the turn-table to the point $w$, may be straight, or the lower chord may be made on a curve from the center of the turn-table to the upper chord.

The two truss-girders are connected together above by transverse bars F and below by bars F', and near the end by a series of bars, $p$, referred to hereinafter.

The upper cross-bars consist in the present instance of H-iron, the lower flanges of which are cut away where they rest on and are secured to the upper chord, as shown in Fig. 4, the lower transverse bars, F', being secured to the lower chord in the manner shown in Fig. 4. The truss-girders are further connected together by diagonal rods $h$ and $i$, which are too clearly indicated in Fig. 5 to need explanation, each rod being furnished, if desired, with a screw-coupling, so that it can be lengthened or shortened. It has not been deemed necessary to show the rivets or filling-pieces which are required in the construction of the frame, as these requirements will be understood by those familiar with structures of this class.

While the details of the structure may be varied as regards the character of the different bars, for instance, the general system of upper and lower chords, verticals, posts, and diagonals should be retained in carrying out my invention.

The manner of connecting the two frames together to complete the turn-table is an important feature of my invention, which I will now proceed to describe.

There is a substantial wrought-iron frame, which I will term the "central frame," and which is composed of the short beams G G', Fig. 7, and connecting-beams H H', Fig. 4, the whole being securely riveted together. Each of the beams G G' consists preferably of a wrought-iron plate, strengthened near all four edges and on opposite sides by angle-irons, to which are riveted flat bars on the upper and lower edges and ends of the beams.

Each connecting-beam H, sections of which are shown in Fig. 4, consists of two plates of iron, each strengthened at the edges by angle-irons, plates, or bars $m$, Fig. 4, being riveted to the angle-irons both on the top and under side of the said connecting-beams.

Between the plates of the two connecting-beams, and through a substantial cast-iron cap-piece, J, Fig. 4, pass the suspension-bolts I, the cap being adapted to the rounded top of the pivot-pin K, which is arranged to turn in the upper end of the post M.

The beam G' of the central frame, Fig. 7, is fitted between and secured to the first posts of the two girders of the frame, Fig. 5, and the other beam, G, between the first posts of the two girders of the frame, Fig. 6, the upper and lower chords of the two frames abutting against each other.

The final and most important means of connecting the two frames together is by substantial wrought-iron links N, (shown detached in Fig. 7 and in their places in Figs. 1 and 4.) There are one or more of these links on each side of each upper chord, and the whole of the links are bolted to the upper chords of the two frames. The lower chords of the two frames should also be connected together by light plates or dowel-pins.

It will be seen that while the central frame serves to maintain the two frames (or, in other words, the two main parts of the turn-table) in their proper lateral position, and is the medium through which the turn-table is supported, the integrity of the structure depends mainly on the links N, which resist the tensile strain to which they are subjected by the said two parts of the turn-table and the load thereon, and maintain the same in line with each other, so that the upper surfaces of the upper chords of the two frames are always in the same plane.

The upper chords of each frame are connected together near their outer ends by a series of transverse H-bars, $p$, four in the present instance, (Figs. 9, 10, and 11,) these bars being secured to the upper chord-bars by strap-bolts $q$, which pass through washer-plates $s$, above which they are provided with nuts.

To each end of the series of bars $p$ is secured a pedestal, P, in which are bearings for the journals of a wheel, $t$, adapted to the usual circular track on the foundation beneath the turn-table.

The great objections to modern turn-tables of wrought-iron are the difficulty and expense of transferring the long and heavy masses of metal from the shops where they are made to their destination, and the labor and heavy tackle and other appliances required in fitting these heavy parts together at the place prepared for the turn-table. These difficulties I effectually obviate, for after my improved turn-table has been put together in the shop, and after it has been properly marked, it can be taken apart, so that there are four comparatively light girders, separate from each other and their connections, and these can be easily transported and the whole put together at the point required without the aid of cumbrous appliances, as every part can be easily handled.

I claim as my invention—

1. The combination, in a turn-table, of two wrought-iron or steel truss-frames, the upper and lower chords of one abutting against those of the other, with links N for connecting the upper chords of both frames together, substantially as described.

2. The combination of a central pivoted frame, constructed substantially in the manner described, with the two truss-frames and connecting-links.

In testimony whereof I have signed my name to this specification in the presence of two subscribing witnesses.

F. C. LOWTHORP.

Witnesses:
HARRY DRURY,
HARRY SMITH.